(12) United States Patent
Eccles

(10) Patent No.: US 6,574,758 B1
(45) Date of Patent: Jun. 3, 2003

(54) TESTING A BUS COUPLED BETWEEN TWO ELECTRONIC DEVICES

(75) Inventor: Christopher M. Eccles, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/522,629

(22) Filed: Mar. 10, 2000

(51) Int. Cl.⁷ ................................................ G06F 11/00
(52) U.S. Cl. ........................................ 714/712; 714/715
(58) Field of Search ................................. 714/712, 715, 714/738, 724, 75, 720

(56) References Cited

U.S. PATENT DOCUMENTS

| | | | |
|---|---|---|---|
| 4,654,857 A | * 3/1987 | Samson et al. ................. | 714/5 |
| 5,202,625 A | 4/1993 | Farwell .................... | 324/158 R |
| 5,228,042 A | 7/1993 | Gauthier et al. ........... | 371/20.5 |
| 5,416,409 A | 5/1995 | Hunter ..................... | 324/158.1 |
| 5,423,050 A | 6/1995 | Taylor et al. ................ | 395/575 |
| 5,473,617 A | 12/1995 | Farwell ...................... | 371/22.3 |
| 5,717,701 A | 2/1998 | Angelotti et al. .......... | 371/22.3 |
| 6,473,871 B1 | * 10/2002 | Coyle et al. ................. | 714/715 |

OTHER PUBLICATIONS

"DDR SDRAM Boldly Charges Ahead", JEDEC Solid State Technology Division, Sep. 22, 1998, 2 pp.
"JEDEC Picks 184 Pin Module For DDR SDRAM", JEDEC Solid State Products Engineering Counsel, Mar. 16, 1998 2 pp.
144 Pin DDR SGRAM SO–DIMM Family, JEDEC Standard No. 21–C, Feb. 22, 1999 and Apr. 14, 1999, pp. 4.5.9–1–4.5.9–10.

* cited by examiner

Primary Examiner—Phung M. Chung
(74) Attorney, Agent, or Firm—Campbell Stephenson Ascolese LLP

(57) ABSTRACT

A bus coupled between two circuits (which may be, for example, each implemented as a single chip) is tested by transmitting from a first circuit a predetermined signal on the bus, and recognizing in the second circuit receipt of the predetermined signal. The predetermined signal indicates the beginning of a sequence of test signals that are transmitted therebetween. When any test signal in the sequence is not received correctly, an error signal is generated to specifically identify the test signal that failed, thereby to identify a faulty line in the bus. In one implementation, test signals in the sequence differ each from the other in just the location of a predetermined pattern of bits. For example, a bit pattern 1010 may be located in the beginning, middle or end of three signals of such a sequence. Therefore, in one embodiment, logic in each circuit simply shifts the bits of the predetermined pattern through different positions to obtain the first and second test signals, and such a sequence is called a "walking pattern."

28 Claims, 5 Drawing Sheets

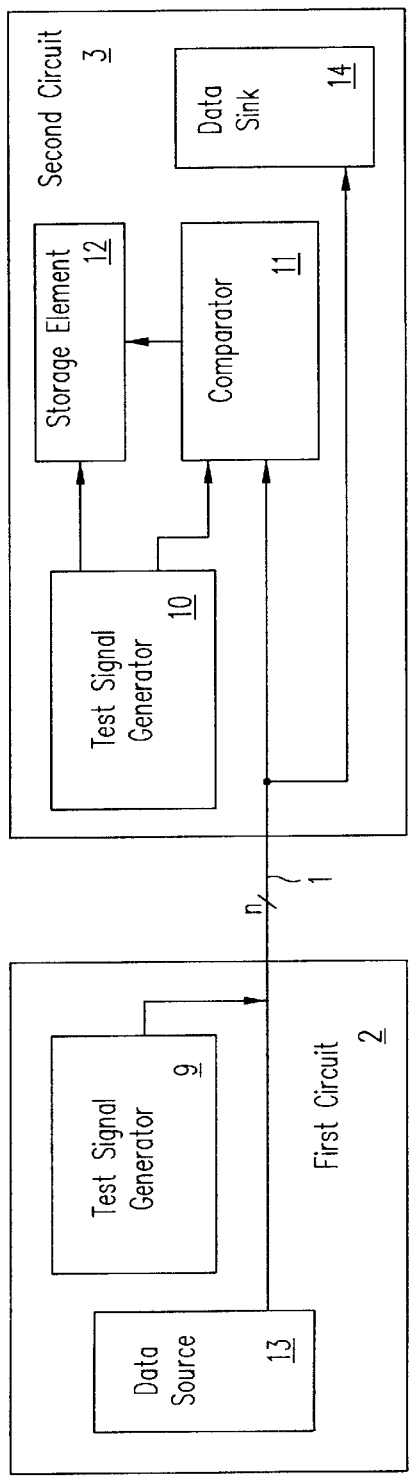
FIG. 2
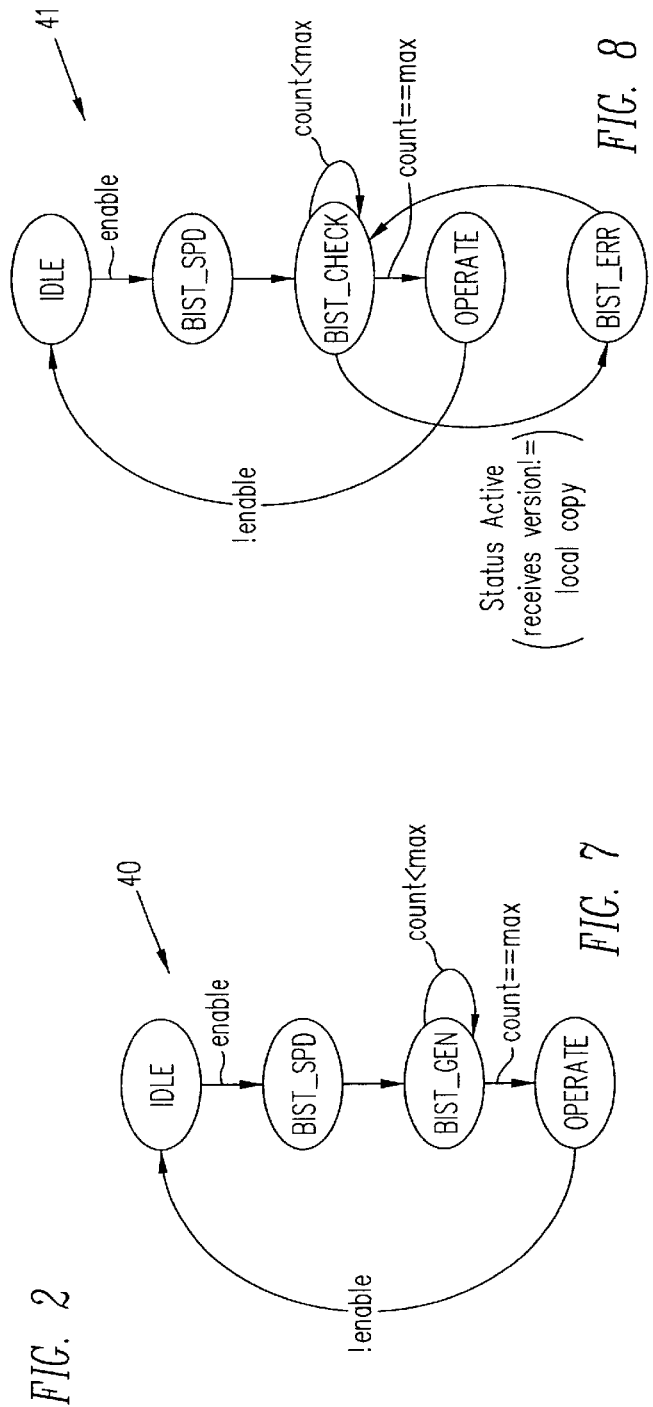
FIG. 7
FIG. 8

| cycle | Value |
|---|---|
| Default | 1 1 1 1 1 1 1 1 1 1 1 1 1 1 1 1 1 1 1 1 1 1 1 1 1 1 1 1 1 1 1 1 |
| Start Signal | 1 0 1 0 1 0 1 0 1 0 1 0 1 0 1 0 1 0 1 0 1 0 1 0 1 0 1 0 1 0 1 0 |
| 1st Test Signal | 1 1 1 1 1 1 1 1 1 1 1 1 1 1 1 1 1 1 1 1 1 1 1 1 1 1 1 1 1 1 1 1 |
| 2nd Test Signal | 1 1 1 1 1 1 1 1 1 1 1 1 1 1 1 1 1 1 1 1 1 1 1 1 1 1 1 1 1 1 1 0 |
| 3rd Test Signal | 1 1 1 1 1 1 1 1 1 1 1 1 1 1 1 1 1 1 1 1 1 1 1 1 1 1 1 1 1 1 0 1 |
| 4th Test Signal | 1 1 1 1 1 1 1 1 1 1 1 1 1 1 1 1 1 1 1 1 1 1 1 1 1 1 1 1 1 0 1 0 |
| 5th Test Signal | 1 1 1 1 1 1 1 1 1 1 1 1 1 1 1 1 1 1 1 1 1 1 1 1 1 1 1 1 0 1 0 1 |
| 6th Test Signal | 1 1 1 1 1 1 1 1 1 1 1 1 1 1 1 1 1 1 1 1 1 1 1 1 1 1 1 0 1 0 1 1 |
| ⋮ | ⋮ |
| 32nd Test Signal | 1 0 1 0 1 1 1 1 1 1 1 1 1 1 1 1 1 1 1 1 1 1 1 1 1 1 1 1 1 1 1 1 |
| 33rd Test Signal | 0 1 0 1 1 1 1 1 1 1 1 1 1 1 1 1 1 1 1 1 1 1 1 1 1 1 1 1 1 1 1 1 |
| 34th Test Signal | 1 0 1 1 1 1 1 1 1 1 1 1 1 1 1 1 1 1 1 1 1 1 1 1 1 1 1 1 1 1 1 1 |
| 35th Test Signal | 0 1 1 1 1 1 1 1 1 1 1 1 1 1 1 1 1 1 1 1 1 1 1 1 1 1 1 1 1 1 1 1 |
| 36th Test Signal | 1 1 1 1 1 1 1 1 1 1 1 1 1 1 1 1 1 1 1 1 1 1 1 1 1 1 1 1 1 1 1 1 |

TESTING A BUS COUPLED BETWEEN TWO ELECTRONIC DEVICES

BACKGROUND

U.S. Pat. No. 5,228,042 (see abstract) describes using pseudo random data to test a bus between two electronic devices. Specifically a "linear feedback shift register" (abbreviated "LFSR") generates a periodic sequence of pseudo random data that is used to test transmission paths between circuits. A second LFSR synchronizes to the transmitted test data after being provided with a seed value corresponding to a transmitted data word. After synchronization, the second LFSR is set to a free running mode and independently generates a pseudo random sequence of patterns corresponding to the sequence generated by the first LFSR. A comparator compares the pseudo random data generated by the second LFSR with the pseudo random data received from the transmission paths. If a mismatch occurs, a signal indicating an error condition is asserted. Both LFSRs receive the same clock signal (via line 18 as described at column 3, lines 60–65 and illustrated in FIG. 1).

See also the following: U.S. Pat. Nos. 5,202,625, 5,228,042, 5,416,409, 5,423,050, 5,473,617 and 5,717,701.

SUMMARY

In one embodiment, a bus having multiple lines and coupled between two electronic circuits (e.g. that communicate at double data rate abbreviated as "DDR") is tested by transmitting from a first circuit a test signal, and recognizing receipt of the test signal in a second circuit. Specifically, the second circuit compares a version of test signal received from the bus with a local copy of the test signal. If the received version does not match the local copy, a comparator in the second circuit indicates failure of receipt of the test signal.

In this embodiment, a sequence (over time, e.g., on successive edges of a clock signal in the case of DDR) of test signal is used to test the bus, and the second circuit specifically identifies the test signal that failed (from among other signals in the sequence) by generating an error signal. Such an error signal can simply indicate the location of the failed test signal in the sequence. In one implementation, the second circuit maintains a registrer, and bits in the register are accessed using the identity of the test signal as the address, and the values of the bits are set by the comparator.

Prior to transmission of the sequence, an indication that the sequence is about to start can be provided in any number of ways. In one implementation, the first circuit indicates to the second circuit that the sequence is about to start by transmitting a predetermined signal (also called "start signal") on the bus. The second circuit recognizes the start signal, and thereafter begins to process the sequence In one implementation, one or more test signals in the sequence are identical to each other except in just the location of a predetermined pattern of bits (i.e. bits having a predetermined value). In one example, a test signal is formed by assigning to a set of four bits the value 1010, and to all remaining bits the value 1. Such a predetermined pattern may be located in the beginning, middle or end of three test signals of such a sequence.

One example of a predetermined pattern tests (using just one test signal that includes bit pattern 010) the relationship between a line carrying a bit of value 1 with two adjacent lines carrying bits of value "0," thereby to identify the line as defective if the bit pattern 000 is received for example. Therefore, if there is crosstalk between two adjacent lines, such lines are specifically identified when the received version of the pattern differs from the pattern that was transmitted (as determined from a locally-generated copy of the transmitted pattern).

In one implementation, location of the predetermined pattern is changed in each test signal of such a sequence, to test all lines of the bus. Any sequence of test signals of the type described herein (i.e. the test signals can be in any order relative to one another) can specifically identify any line that is defective. In one variant of the above-described example, the predetermined pattern is shifted (to the left or to the right depending on the implementation) one position at a time so as to sequentially generate test signals that test each line of the bus.

So, almost all test signals of such a sequence are derived by simply shifting (e.g. to the left) the bits of a predetermined pattern in a sequential manner. Therefore, in one embodiment, each circuit includes a shifter that shifts the predetermined pattern to obtain the sequence of test signals, and such a sequence is called a "walking pattern." In a "walking pattern" sequence of the type described herein, location of a failed test signal in the sequence automatically identifies the line having the failure (because of the single bit difference in position between two successive test signals of the sequence).

Instead of generating pseudo random patterns of the type described in the above-discussed U.S. Pat. No. 5,228,042, the circuitry of the type described herein generates a sequence of test signals that are known in advance. Moreover, the sequence specifically identifies which of the one or more lines in the bus is/are faulty, unlike U.S. Pat. No. 5,228,042. Furthermore, sequences of the type described herein can be obtained by a simple shift operation in each of the two devices, thereby to eliminate complex circuitry otherwise required to generate pseudo random patterns as discussed in U.S. Pat. No. 5,228,042.

BRIEF DESCRIPTION OF THE DRAWINGS

FIG. 2 illustrates, in an intermediate-level block diagram, circuitry to perform the acts illustrated in FIG. 1.

FIGS. 7 and 8 illustrate, in state diagrams, the state machines of FIGS. 5 and 6 respectively.

DETAILED DESCRIPTION

In one embodiment of the invention, a bus 1 (FIG. 2) coupled between two circuits (such as integrated circuit chips) is tested as follows: a first circuit 2 transmits a test signal on bus 1, a second circuit 3 recognizes the test signal received from bus 1, and if the test signal is not recognized, second circuit 3 generates an error signal. The error signal indicates the identity of the test signal that failed, from among a number of test signals that are used to test bus 1.

Figure 1:
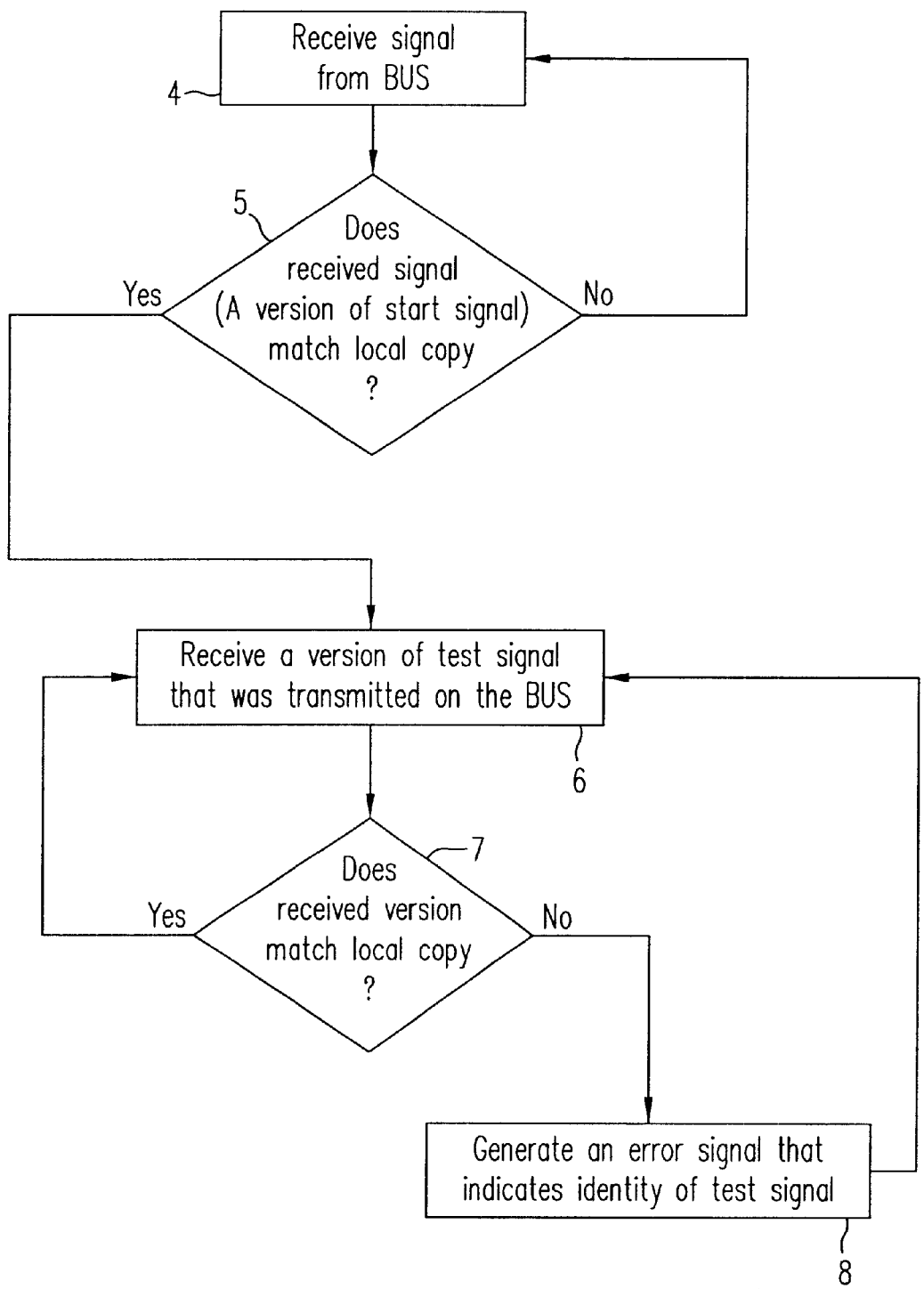
FIG. 1 illustrates, in a flow chart, acts performed to test a bus in one embodiment of the invention.

Prior to transmission of any test signal, an indication that testing is about to start is provided, in this embodiment, via a predetermined signal (also called "start signal") that is also transmitted on the bus that is to be tested. Second circuit 3 receives (see act 4 illustrated in FIG. 1) the signal from bus 1 and checks (see act 5) if the received signal matches a local copy of the start signal. If not, second circuit 3 returns to act 4 (e.g. in case a random value is erroneously received from bus 1, or in case bus 1 is carrying a default valued signal). Second circuit 3 loops between acts 4 and 5 (FIG. 1) until the received signal matches the local copy of start signal (which indicates that the start signal was received uncorrupted). Note that in this embodiment, each of first circuit 2 and second circuit 3 contain locally therein identical copies of the start signal.

Next, in act 6, second circuit 3 receives a version of a test signal transmitted on bus 1. Note that the word "version" is used herein to indicate a signal received from bus 1 that may or may not be different from the signal transmitted on bus 1, depending on whether or not there are faults in bus 1. If there are no faults in bus 1, the version of a signal and the signal itself have the same value. If there is a fault that affects transmission of the signal, the version and the signal have different values.

Then, in act 7, second circuit 3 compares the received version of a transmitted test signal with a local copy of the test signal. If there is a match, second circuit 3 returns to act 6 to continue the testing. If there is no match, second circuit 3 goes to act 8 to generate an error signal that indicates an identity of the test signal. Thereafter, circuit 3 returns to act 6, again to continue the testing of bus 1.

Depending on the embodiment, any one or more of the above-described signals (i.e. the start signal and one or more test signals) can be generated in a third circuit and transferred to each of circuits 2 and 3. In this embodiment, each of circuits 2 and 3 includes circuitry (called "test signal generator") that is each similar or identical to the other, and that each generates a sequence of test signals used in testing bus 1.

Specifically, circuit 2 includes a test signal generator 9 that generates test signals that are transmitted on bus 1. Moreover, circuit 3 includes another test signal generator 10 that generates a local copy of the test signal for use by a comparator 11 that is also included in circuit 3. Comparator 11 is coupled to bus 1 to receive therefrom a version of the test signal. Comparator 11 compares the received version with the local copy, and drives a status signal active or inactive depending on the result of comparison.

A storage element 12 also included in circuit 3 combines the status signal with an identity of the test signal (from test signal generator 10) for use in identifying faults in bus 1. When no faults are found on completion of testing, bus 1 is used in the normal manner, e.g. by a data source 13 in circuit 2 to transmit data to a data sink 14 in circuit 3 (FIG. 2).

Figures 3, 5:
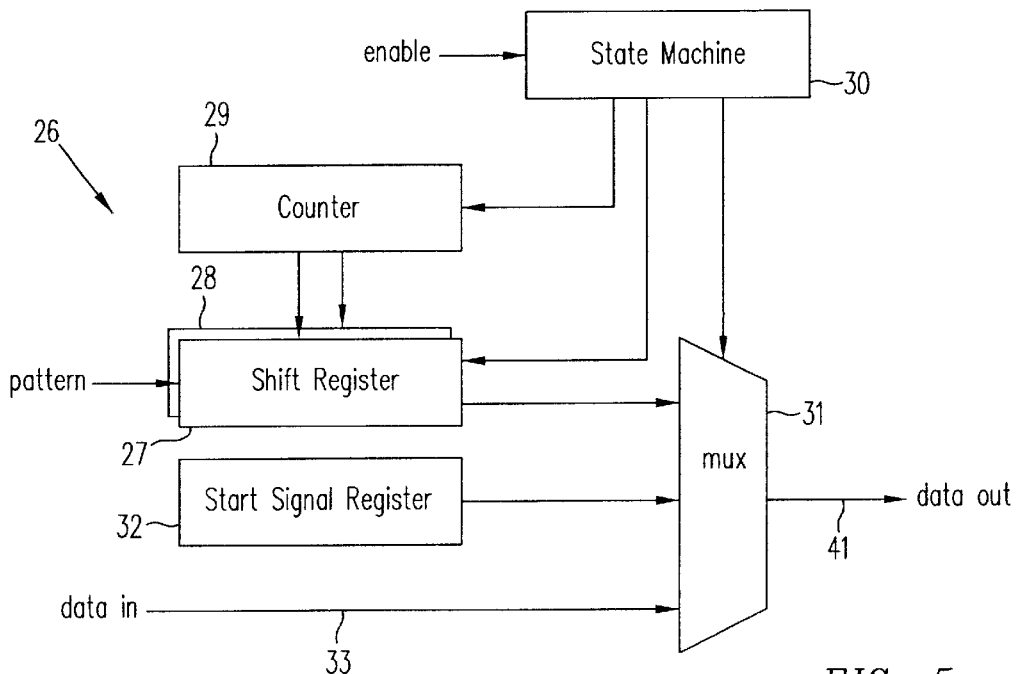
FIG. 3 illustrates one example of a sequence of test signals.
FIGS. 5 and 6 illustrate, in low-level block diagrams, logic elements and storage elements included in one implementation of test signal generator and a test signal checker (FIG. 4) respectively.

Initially, on power up, there is no signal on bus 1, and all lines carry a default value (e.g. value 1 in FIG. 3). Next, circuit 2 transmits a start signal that has a preselected value. The value is selected (also referred to as "determined") to avoid the possibility of an erroneously received random value being mistaken for the start signal. In the example illustrated in FIG. 3, the start signal is formed of alternating 1s and 0s. In other examples, the start signal can be formed of two or more pairs of bits of value "10" located at predetermined locations (e.g. the two most significant bits and the two least significant bits).

Thereafter, a number of test signals are generated and transmitted on bus 1, one after another, in a sequence. In the example illustrated in FIG. 3, each test signal in the sequence is obtained by simply left shifting a predetermined pattern "1010" with all remaining bits being set to their default value of 1. Specifically, the least significant bit of the first test signal is set to have the value identical to the most significant bit of the pattern. In the specific example of FIG. 3, the most significant bit of the pattern has the value 1, which is identical to the default value of 1, and therefore the first test signal has all bits of value 1. The second test signal is generated by left shifting the whole first test signal by one bit and using the next bit of the predetermined pattern as the least significant bit. So, in this example, the least significant bit is set to value 0.

In this manner, each of the test signals is obtained by left shifting the previous test signal, and replacing the least significant bit with a bit from the predetermined pattern, until all bits of the predetermined pattern are used up (e.g. as illustrated by the fourth test signal in FIG. 3). Thereafter, the least significant bit is replaced with the default value bit (in this example, value 1). Note that to test all lines of bus 1 having width t, with a predetermined pattern having width p, a total of (t+p) test signals are required.

In the above-described sequence, most of the test signals (e.g. 4th signal to the 32nd signal in FIG. 3) have the complete predetermined pattern, with just the location of the predetermined pattern being different in the different test signals. Also, all other bits of these test signals (i.e. all bits other than bits in the predetermined pattern) have a common value (e.g. all have value 1, or all have value 0) which may be the default value.

Although in the example illustrated in FIG. 3, certain values have been used, the corresponding inverse values can also be used (e.g. 1 can be replaced by 0 and vice versa). Also, the predetermined pattern can have any value, e.g. the value 0000 when the default value is all 1s.

Furthermore, although left shift was described in the example illustrated in FIG. 3, right shift can also be used. Furthermore, neither shift operation is really necessary, e.g. if all 36 test signals are stored in a memory in each of circuits 2 and 3.

In the just-described example, there is no need to store and use the 36 test signals in the specific sequence illustrated in FIG. 3 (i.e. any random sequence can be used, so long as the test signal generators 9 and 10 of circuits 2 and 3 behave in an identical manner in retrieving the stored test signals). However, the sequence obtained by shifting the predetermined pattern is a predictable sequence, because the location of a test signal in the sequence directly corresponds to (e.g. the numbers are identical) the number of locations through which the predetermined pattern is shifted.

In one implementation, bus 15 (FIG. 4) is operated at double data rate (DDR), wherein successive signals are transmitted on bus 15 at successive clock edges. Specifically, a first circuit 16 includes an encoder 17 that receives an m-bit signal in any one clock cycle, and transmits on bus 15 two n-bit signals at the two clock edges of the next clock cycle (i.e. m=2n). Similarly, a second circuit 18 includes a decoder 19 that receives from bus 15 the two n-bit signals at the two clock edges and generates a single m-bit signal in the next clock cycle. Note that encoder 17 is clocked by a signal CLOCK_1 that is different from signal CLOCK_2 used to clock decoder 19, although both signals have the same frequency (e.g. 125 MHz).

Figure 4:
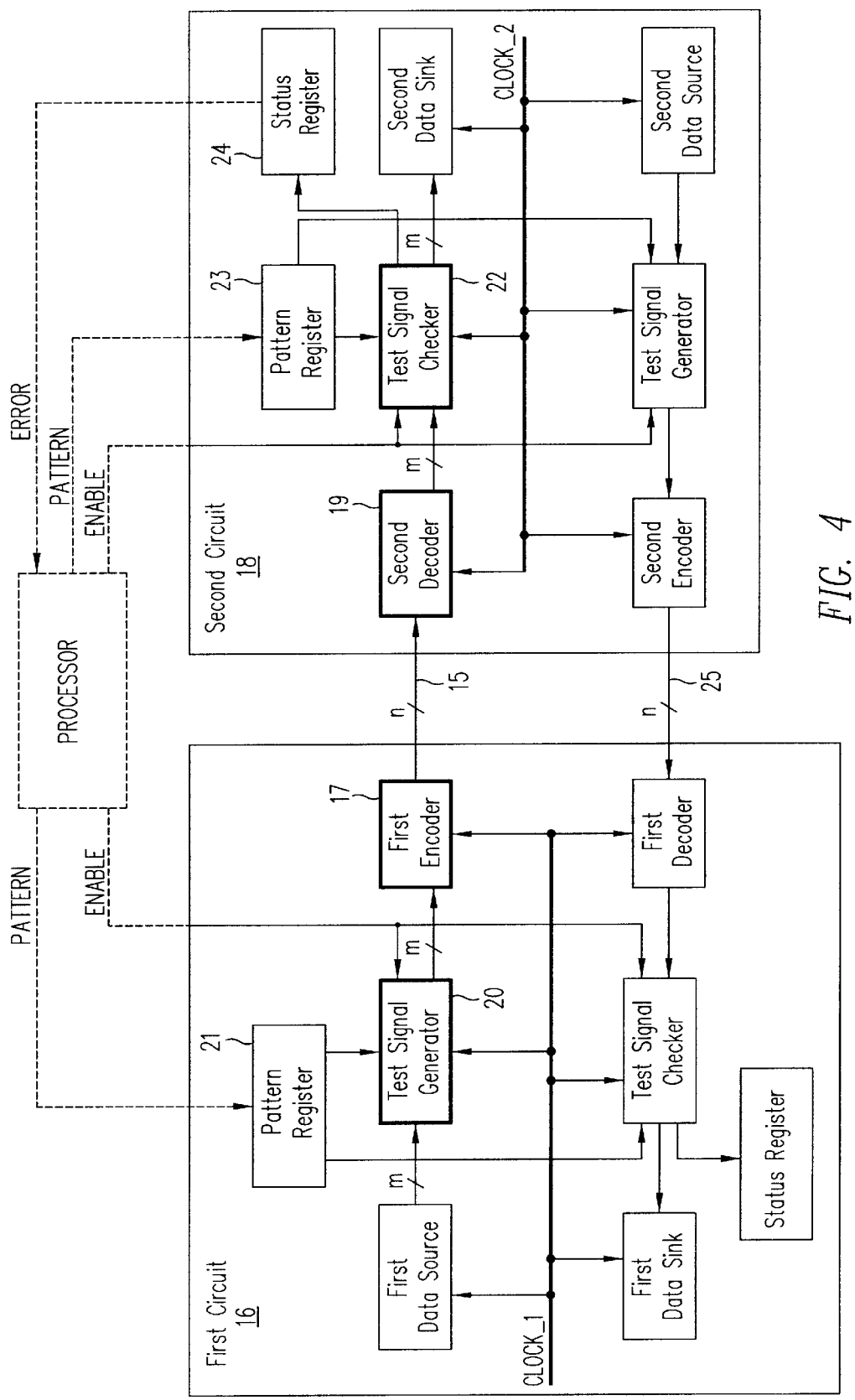
FIG. 4 illustrates, in a high-level block diagram, one implementation in accordance with the invention.

In the implementation illustrated in FIG. 4, test signal generator 20 included in circuit 16 is similar to the above-described test signal generator 9 except for the following differences. Specifically, test signal generator 20 is coupled to a storage element (also called "pattern register") 21 to receive therefrom a predetermined pattern that is used to generate test signals. Test signal generator 20 generates and supplies to encoder 17 two test signals in each cycle, thereby to test the use of successive clock edges (i.e. positive edge and negative edge) on bus 15.

Moreover, in the implementation illustrated in FIG. 4, a test signal checker 22 included in circuit 18 is similar to the above-described combination of test signal generator 10 and comparator 11 (FIG. 2), except for the differences related to DDR described above in reference to test signal generator 20. For example, test signal checker 22 simultaneously compares, in each cycle, two versions of n-bit signals received from bus 15 with the corresponding local copies generated from the pattern held in pattern register 23. Moreover, test signal checker 22 simultaneously supplies two status signals to status register 24.

Note that, in the implementation illustrated in FIG. 4, another bus 25 transfers data from circuit 18 to circuit 16, and coupled thereto are circuits (not labeled) of the type described above in reference to bus 15.

To support double data rate, a test signal generator 26 (FIG. 5) includes two n-bit shift registers 27 and 28 that are operated simultaneously, to generate two test signals in a single clock cycle. Each of shift registers 27 and 28 receives a signal from counter 29 indicative of the position of the predetermined pattern within the to-be-generated test signal. Note that, in this implementation, counter 29 generates two signals (for registers 27 and 28) that differ by one bit position.

Each of counter 29, and shift registers 27 and 28 are clocked by a signal from a state machine 30 that is also included in test signal generator 26. As described below, state machine 30 also operates a multiplexer 31 that selectively passes the test signals, or a start signal (from a start signal register 32 included in generator 26).

Multiplexer 31 can also select a data signal (from a data bus 33) in case test signal generator 26 is implemented to receive data from a data source for transmission to the bus (e.g. as generator 20 illustrated in FIG. 4). However, in case test signal generator 26 is implemented as a portion of a test signal checker 34 (FIG. 6), counter 29 also provides signals indicative of test signals to a bus 35 that is coupled to status register 36. Status register 36 is coupled to receive the results of comparisons from comparator 37 in the manner described above in reference to FIG. 2.

A state machine 40 (FIG. 7) which is implemented in generator 20, initially powers up in the state IDLE, and in this state bus 41 (FIG. 5) carries the default value signal. Thereafter, in response to an active signal (also called "enable signal"), state machine 40 transitions to state BIST_SPD. In state BIST_SPD, state machine 40 sends out the predetermined start signal, by operating multiplexer 31 (FIG. 5) to couple register 32 to bus 41. Next, state machine 40 transitions to state BIST_GEN.

State machine 40 stays in state BIST_GEN while operating counter 29 and shift registers 27 and 28. The value in counter 29 is incremented by two during each clock period (as there are two transmissions, one on each clock edge) until the value reaches a predetermined maximum (e.g. the value (p+t) which is described above). Thereafter, state machine 40 transitions to state OPERATE. State machine 40 stays in state OPERATE while operating multiplexer 31 to couple bus 33 to bus 41, until the enable signal becomes inactive at which time state machine 40 returns to state IDLE.

Figure 6:
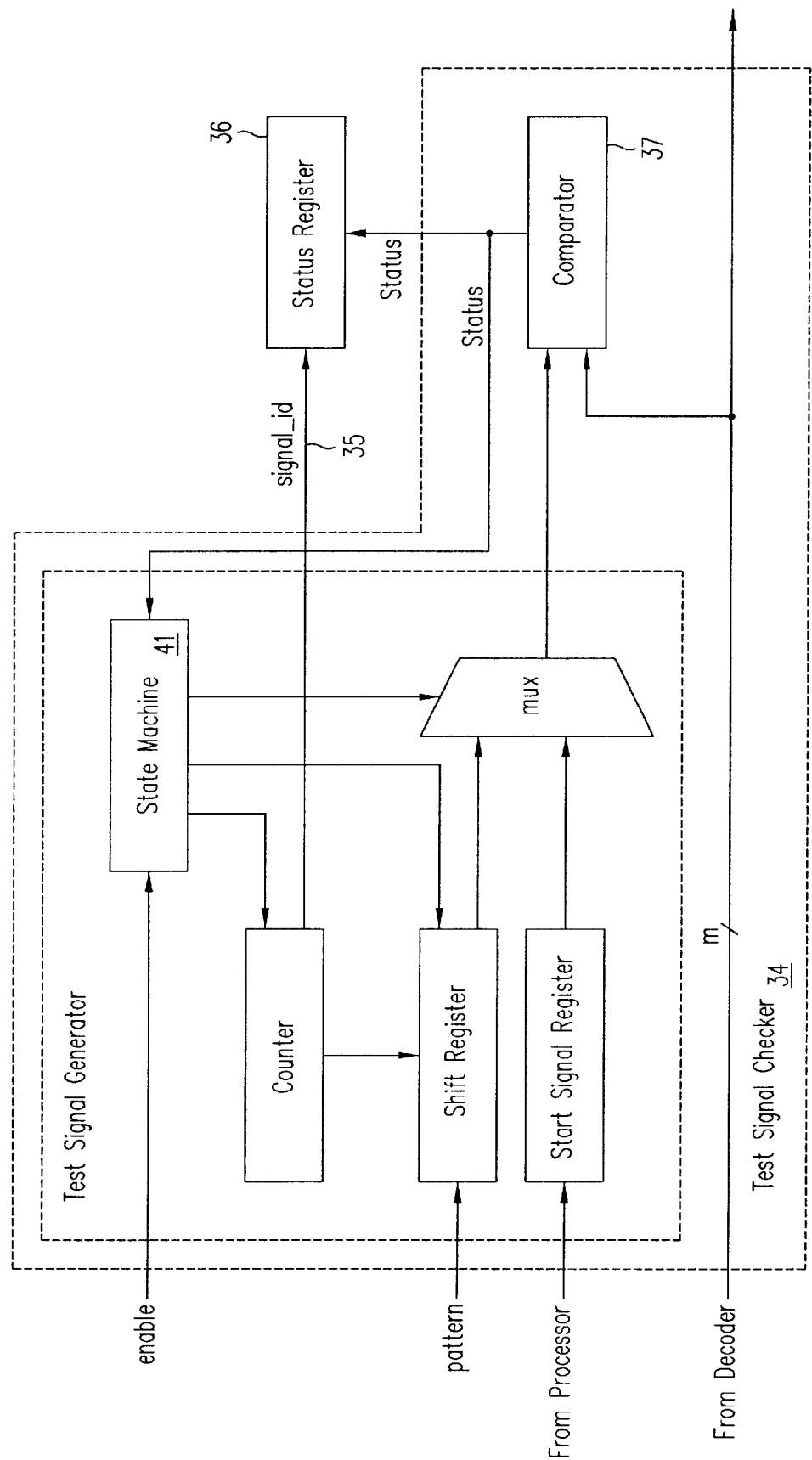

Another state machine 41 (FIG. 8) which is implemented in checker 34 (FIG. 6) has states and transitions similar to those discussed above in reference to state machine 40 except for the following differences. Instead of state BIST_GEN, state machine 41 has state BIST_CHECK wherein state machine 41 monitors the status signal generated by comparator 37 (FIG. 6). If status signal is active (indicating that a match was not found), state machine 41 transitions to state BIST_ERR, to log an error and returns to state BIST_CHECK. As before, state machine 41 transitions from state BIST_CHECK to state OPERATE when the predetermined maximum is reached by the counter.

Numerous modifications and adaptations of the embodiments, implementations and variations described herein will be apparent to a person skilled in logic design in view of the disclosure. For example, in another implementation, the first circuit sends a predetermined sequence of bits on a single line that is connected to the second circuit (the single line may or may not be part of the to-be-tested bus).

In yet another implementation, each of the first circuit and the second circuit are informed simultaneously to start the bus testing (in the manner described above) by a third circuit.

Also, in still another implementation, instead of using the predetermined pattern directly to obtain the test signals, the predetermined pattern may be inverted prior to shifting.

Moreover, instead of shifting, any other logical operation can be performed to obtain the test signals.

Furthermore, in another embodiment, a status signal indicating that a match was not found can be used by the processor to generate an additional test signal and transmit the additional test signal to each of the first and second circuits, for further testing of the bus. Note that such an additional test signal can also be generated locally, within each of the test signal generators that are coupled to the bus-under-test.

Also, the implementation discussed above in reference to FIG. 4 is built into asic chips, and is therefore a permanent part of the datapath circuitry coupled to the bus. However, in other implementations, such circuitry can be built external to the datapath.

Therefore, numerous such modifications and adaptations are encompassed by the attached claims.

What is claimed is:

1. A method of testing a bus, the method comprising:
   receiving a version of a first signal transmitted on the bus;
   comparing the received version with a local copy of the first signal;
   generating at least an error signal that indicates an identity of the first signal if a match is not found during the comparison; and
   repeating, at least once using a second signal, the acts of receiving, comparing and generating.

2. The method of claim 1 wherein:
   each act of receiving is performed on successive edges of a clock signal used in performing the act of comparing; and
   at least two acts of comparing are performed simultaneously.

3. The method of claim 1 further comprising, prior to receiving and comparing:
   transmitting a start signal on the bus; and
   comparing a version of the start signal received from the bus with a copy of the start signal.

4. The method of claim 3 wherein:

the start signal includes a plurality of pairs of bits having value "10" at predetermined locations therein.

5. The method of claim 4 wherein:

the start signal consists of alternating 1s and 0s.

6. The method of claim 1 further comprising:

in a first device coupled to the bus, receiving at least a portion of the first signal from a third device; and in a second device coupled to the bus, receiving a copy of said portion from the third device;

wherein the comparison is performed in the second device.

7. The method of claim 6 further comprising:

using a first clock signal in the first device to transmit the first signal and to transmit the second signal on successive edges thereof; and using a second clock signal in the second device to perform the receivings.

8. The method of claim 6 wherein the first signal and the second signal form two of a sequence of signals received from the bus by the second device, the method further comprising:

shifting said copy of said portion through a first number of locations to generate the copy of the first signal; and shifting said copy of said portion through a second number of locations to generate the copy of the second signal;

wherein the first number and the second number correspond to a location of said first signal and said second signal in the sequence.

9. The method of claim 6 further comprising:

in the first device, generating the second signal by a predetermined logical operation on said portion; and in the second device, generating the copy of second signal from the copy of said portion by said predetermined logical operation.

10. The method of claim 9 wherein:

the predetermined logical operation includes left shift.

11. The method of claim 9 wherein:

the predetermined logical operation includes right shift.

12. The method of claim 1 wherein:

the first signal includes a predetermined pattern of bits, the second signal also includes the predetermined pattern of bits;

location of the predetermined pattern in the second signal is different from location of the predetermined pattern in the first signal; and in each of the second signal and the first signal, bits other than bits in the predetermined pattern, all have value 1 or all have value 0.

13. The method of claim 12 wherein:

the predetermined pattern of bits is other than all 1s and all 0s.

14. The method of claim 12 wherein:

all bits in the predetermined pattern have the value 0;

bits of the first signal other than bits in the predetermined pattern all have the value 1; and bits of the second signal other than bits in the predetermined pattern all have the value 1.

15. The method of claim 12 wherein:

all bits in the predetermined pattern have the value 1;

bits of the first signal other than bits in the predetermined pattern all have the value 0; and bits of the second signal other than bits in the predetermined pattern all have the value 0.

16. The method of claim 12 wherein:

the number of bits in the group is four.

17. A circuit for testing a bus, the circuit comprising:

a comparator coupled to the bus;

a test signal generator coupled to the comparator to supply thereto a local copy of a test signal for comparison with a version of the test signal received from the bus; and a storage element coupled to the test signal generator to receive therefrom an identity of the signal, the storage element being further coupled to the comparator to receive therefrom a result of the comparison.

18. The circuit of claim 17 wherein the storage element is hereinafter "status store," the circuit further comprising:

a pattern store coupled to the test signal generator, the pattern store having a width smaller than width of the bus;

wherein:

the test signal generator generates a sequence of test signals including said test signal;

a first signal in the sequence includes a predetermined pattern of bits, a second signal in the sequence also includes the predetermined pattern of bits;

location of the predetermined pattern in the second signal is different from location of the predetermined pattern in the first signal; and in each of the second signal and the first signal, bits other than bits in the predetermined pattern, all have value 1 or all have value 0.

19. The circuit of claim 18 wherein:

the number of bits in the predetermined pattern is y; and the pattern store holds said predetermined pattern.

20. The circuit of claim 17 further comprising:

an encoder coupled between the test signal generator and the bus;

wherein the first signal and the second signal are transmitted by the encoder on successive edges of a clock signal used to operate the test signal generator.

21. The circuit of claim 17 wherein the test signal generator includes:

a shifter having an input port coupled to the storage element to receive therefrom a y-bit signal, the shifter further having an output port coupled to the comparator, the output port being n bits wide, with y<n; and a counter coupled to the shifter and to the storage element.

22. The circuit of claim 17 wherein the storage element is hereinafter referred to as "the first storage element," the test signal generator is hereinafter referred to as "the first generator," the circuit further comprising:

a second storage element having the width of y bits; and a second generator coupled between the second storage element and the bus to supply the test signal thereto.

23. The circuit of claim 22 further comprising:

a data source coupled to the bus for supplying data thereto, each of the data source and the first generator receiving a first clock signal;

a data sink coupled to the bus for receiving data therefrom, each of the data sink and the comparator receiving a second clock signal; and each of the first clock signal and the second clock signal have the same frequency.

24. The circuit of claim 17 further comprising:

another storage element coupled to the comparator to supply thereto a local copy of a start signal for comparison with a version of the start signal received from the bus prior to receipt of the version of test signal.

25. A circuit for testing a bus having a plurality of lines connected between a first device and a second device, the circuit comprising:

in the first device, a test signal generator coupled to the bus, the test signal generator generating a first test signal and a second test signal, the second test signal having at least a group of bits in common with the first test signal wherein location of the group in the second test signal is different from location of the group in the first test signal and all bits other than bits in the group have an identical value; and in the second device, a comparator coupled to the bus to receive therefrom the first test signal and the second test signal, the comparator comparing the first test signal with a copy of the first test signal, and further comparing the second test signal with a copy of the second test signal, the comparator driving an error signal active when a match is not found during any comparison, the error signal being related to whichever of the first test signal and the second test signal was used in performing the comparison that resulted in match being not found.

26. The circuit of claim 25 wherein:

the first device includes a data source coupled to the bus for supplying data thereto, each of the data source and the test signal generator receiving a first clock signal;

the second device includes a data sink coupled to the bus for receiving data therefrom, each of the data sink and the comparator receiving a second clock signal; and each of the first clock signal and the second clock signal have the same frequency.

27. The circuit of claim 25 wherein:

the first device includes an encoder coupled between the bus and the test signal generator, wherein the encoder transmits the first test signal and the second test signal on successive edges of the first clock signal; and the second device includes a decoder coupled between the bus and the comparator, the decoder receiving the first test signal and the second test signal on successive edges of the second clock signal.

28. The circuit of claim 25 wherein:

the bus has a width of n bits;

the first device includes a storage element having a width of y bits with y<n; and the test signal generator includes a shifter having a width of n bits, the shifter having an input port coupled to the storage element to receive therefrom a pattern of y bits, the shifter further having an output port coupled to the bus to supply thereto at least the first test signal and the second test signal.

* * * * *